US010481474B2

(12) United States Patent
Liao (10) Patent No.: US 10,481,474 B2
(45) Date of Patent: Nov. 19, 2019

(54) WAVELENGTH CONVERSION FILTER MODULE AND ILLUMINATION SYSTEM

(71) Applicant: Coretronic Corporation, Hsin-Chu (TW)

(72) Inventor: Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 70 days.

(21) Appl. No.: 15/952,243

(22) Filed: Apr. 13, 2018

(65) Prior Publication Data

US 2018/0314140 A1   Nov. 1, 2018

(30) Foreign Application Priority Data

Apr. 27, 2017 (CN) .......................... 2017 1 0286495

(51) Int. Cl.
  *G03B 21/20* (2006.01)
  *G03B 33/08* (2006.01)
  *G03B 21/16* (2006.01)
(52) U.S. Cl.
  CPC .......... *G03B 21/204* (2013.01); *G03B 33/08* (2013.01); *G03B 21/16* (2013.01)
(58) Field of Classification Search
  CPC ................................................... G03B 21/204
  USPC ........................................................ 362/84
  See application file for complete search history.

(56) References Cited

U.S. PATENT DOCUMENTS

| 7,772,534 | B2 | 8/2010 | Ito |
| 9,581,879 | B2 | 2/2017 | Hsieh et al. |
| 10,268,111 | B2 * | 4/2019 | Ikeda ................. G03B 21/204 |
| 2011/0090466 | A1 | 4/2011 | Chiang |
| 2012/0075590 | A1 * | 3/2012 | Huang ................. G03B 21/204 353/31 |
| 2012/0102126 | A1 | 4/2012 | Murphy et al. |
| 2012/0243205 | A1 * | 9/2012 | Lin ..................... G03B 21/204 362/84 |
| 2013/0056775 | A1 * | 3/2013 | Kawakami ............. G02F 1/00 257/98 |

(Continued)

FOREIGN PATENT DOCUMENTS

| CN | 1945511 | 4/2007 |
| CN | 101764016 | 6/2010 |

(Continued)

*Primary Examiner* — William N Harris
(74) *Attorney, Agent, or Firm* — JCIPRNET (57) ABSTRACT

A wavelength conversion filter module and an illumination system are provided. The wavelength conversion filter module includes a carrier and a wavelength conversion filter unit. The wavelength conversion filter unit is located in a wavelength conversion filter region of the carrier, and the wavelength conversion filter unit includes a filter reflective device, a wavelength conversion device, and a first filter device disposed on the carrier in order. The first filter device is suitable for allowing the excitation beam to pass through. The wavelength conversion device is suitable for converting the excitation beam into a conversion beam. The conversion beam includes a specific color beam and a color beam other than the specific color beam. The filter reflective device is suitable for reflecting the specific color beam and absorbing the color beam other than the specific color beam. The reflected specific color beam passes through the first filter device.

18 Claims, 4 Drawing Sheets

(56) References Cited

U.S. PATENT DOCUMENTS

| | | | |
|---|---|---|---|
| 2013/0088689 A1* | 4/2013 | Lin | G03B 21/204 353/31 |
| 2013/0126930 A1* | 5/2013 | Kabuki | C09K 11/646 257/98 |
| 2013/0194644 A1 | 8/2013 | Cable et al. | |
| 2013/0258639 A1 | 10/2013 | Hu et al. | |
| 2014/0253882 A1 | 9/2014 | King et al. | |
| 2015/0002824 A1 | 1/2015 | Kasugai et al. | |
| 2015/0098070 A1* | 4/2015 | Hsieh | G02F 1/353 355/67 |
| 2016/0252722 A1* | 9/2016 | Li | G02B 26/008 362/84 |
| 2016/0363294 A1 | 12/2016 | Yu et al. | |
| 2017/0167710 A1* | 6/2017 | Wu | G02F 1/35 |
| 2017/0180686 A1* | 6/2017 | Chen | G02B 26/008 |
| 2018/0108814 A1* | 4/2018 | Zheng | H01L 33/502 |
| 2018/0259834 A1* | 9/2018 | Endo | G03B 21/204 |

FOREIGN PATENT DOCUMENTS

| | | |
|---|---|---|
| CN | 102103435 | 6/2011 |
| CN | 102272953 | 12/2011 |
| CN | 102272954 | 12/2011 |
| CN | 102298467 | 12/2011 |
| CN | 102426403 | 4/2012 |
| CN | 102540656 | 7/2012 |
| CN | 102720957 | 10/2012 |
| CN | 202708991 | 1/2013 |
| CN | 103105659 | 5/2013 |
| CN | 103116204 | 5/2013 |
| CN | 203810292 | 9/2014 |
| CN | 103052841 | 2/2015 |
| CN | 102289141 | 7/2015 |
| CN | 105093776 | 11/2015 |
| CN | 103890138 | 6/2016 |
| TW | 200722893 | 6/2007 |
| TW | 201214009 | 4/2012 |
| TW | 201239508 | 10/2012 |
| TW | I512385 | 12/2015 |
| TW | I515506 | 1/2016 |
| WO | 0147285 | 6/2001 |
| WO | 2013071742 | 5/2013 |

\* cited by examiner

WAVELENGTH CONVERSION FILTER MODULE AND ILLUMINATION SYSTEM

CROSS-REFERENCE TO RELATED APPLICATION

This application claims the priority benefit of China application serial no. 201710286495.2, filed on Apr. 27, 2017. The entirety of the above-mentioned patent application is hereby incorporated by reference herein and made a part of this specification.

BACKGROUND OF THE INVENTION

Field of the Invention

The invention relates to an optical device and an optical system, and more particularly, to a wavelength conversion filter module and an illumination system.

Description of Related Art

In recent years, a projection device based on a solid-state light source such as a light-emitting diode (LED) and a laser diode has gradually earned a place in the market. The laser diode has high luminous efficiency, and the laser beam emitted by the laser diode not only can be used to excite phosphor, but can be directly used as the illumination light source of the projection device, and the number of the laser diodes can be adjusted in correspondence to brightness requirements to meet various different brightness requirements of the projection device. Therefore, the projection device adopting a laser light source has very high potential to replace the traditional high-pressure mercury lamp to become the new generation of mainstream projection device.

In the current laser projection device, phosphor is mixed with silicone and then the mixture is coated on a high reflectivity substrate to form a phosphor wheel. The laser (such as blue light) emitted from the laser diode is focused on the phosphor wheel via an optical device. The phosphor in the phosphor wheel absorbs blue light and emits a specific color beam such as red light and green light. Since the current red light and green light emitted by the phosphor cannot achieve the desired color specification of the laser projection device, the current laser projection device requires a filter wheel synchronously rotating with the phosphor wheel to generate red light and green light that meet color specifications.

However, the filter wheel not only increases the cost of the illumination system, but also makes the design of the illumination system more complex. Since the beam emitted by the phosphor wheel is divergent, spoke light formed on the filter wheel is relatively divergent, i.e., the area of the spoke light formed on the filter wheel is greater. The spoke light having a large area may fall on two adjacent filter devices in the filter wheel such that color cast occurs to beams emitted from the filter wheel, and the color performance of the image projected by the laser projection device is affected as a result. Therefore, how to omit the filter wheel but achieve the desired color specification is an issue to be solved by those skilled in the art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The wavelength conversion filter module provided by the invention can provide a specific color beam having high color purity.

The illumination system provided by the invention can omit a filter wheel but achieve the desired color specification.

Other objects and advantages of the invention can be further understood from the technical features disclosed in the invention.

To achieve one or some or all of the objects above or other objects, an embodiment of the invention provides a wavelength conversion filter module including a carrier and a wavelength conversion filter unit. The carrier has a plurality of optical regions and is adapted to move to allow the optical regions to receive an excitation beam in order. At least one of the optical regions is a wavelength conversion filter region. The wavelength conversion filter unit is located in the wavelength conversion filter region and includes a filter reflective device, a wavelength conversion device, and a first filter device disposed on the carrier in order. The first filter device is suitable for allowing the excitation beam incident on the wavelength conversion filter unit to pass through. The wavelength conversion device is suitable for converting the excitation beam into a conversion beam. The conversion beam includes a specific color beam and a color beam other than the specific color beam. The filter reflective device is suitable for reflecting the specific color beam and absorbing the color beam other than the specific color beam. The first filter device is suitable for allowing the specific color beam to pass through and reflecting a color beam other than the specific color beam and the excitation beam.

To achieve one or some or all of the objects above or other objects, an embodiment of the invention provides a wavelength conversion filter module including a carrier and a wavelength conversion filter unit. The carrier has a plurality of optical regions and is adapted to move to allow the optical regions to receive an excitation beam in order. At least one of the optical regions is a wavelength conversion filter region, and the carrier has an opening overlapped with the wavelength conversion filter region. The wavelength conversion filter unit is located in the wavelength conversion filter region and includes a second filter device, a wavelength conversion device, and a first filter device disposed on the carrier in order. The first filter device is suitable for allowing the excitation beam incident on the wavelength conversion filter unit to pass through. The wavelength conversion device is suitable for converting the excitation beam into a conversion beam. The conversion beam includes a specific color beam and a color beam other than the specific color beam. The second filter device is suitable for reflecting the specific color beam and allowing the color beam other than the specific color beam to pass through. The first filter device is suitable for allowing the specific color beam to pass through and reflecting a color beam other than the specific color beam and the excitation beam.

To achieve one or some or all of the objects above or other objects, an embodiment of the invention provides an illumination system including an excitation light source suitable for providing an excitation beam and any wavelength conversion filter module above. The wavelength conversion filter module is disposed on the transmission path of the excitation beam.

Based on the above, the embodiments of the invention have at least one of the following advantages or efficacies. In the wavelength conversion filter module of an embodiment of the invention, since the filter reflective device disposed below the wavelength conversion device can reflect the specific color beam in the conversion beam and absorb the color beam other than the specific color beam in the conversion beam, and the first filter device disposed on the wavelength conversion device can allow the specific color beam and the excitation beam to pass through and reflect the color beam other than the specific color beam and the excitation beam, the wavelength conversion filter module can provide the specific color beam having higher color purity, and the illumination system adopting the wavelength conversion filter module can omit the filter wheel but achieve the desired color specification. In the wavelength conversion filter module of another embodiment of the invention, since the second filter device disposed below the wavelength conversion device can reflect the specific color beam in the conversion beam and allow the color beam other than the specific color beam in the conversion beam to pass through, and the color beam other than the specific color beam is emitted from the wavelength conversion filter module via the opening of the carrier and can be filtered by a filter device disposed outside the wavelength conversion filter module or absorbed by a light absorbing device disposed outside the wavelength conversion filter module, and the first filter device disposed on the wavelength conversion device can allow the specific color beam and the excitation beam to pass through and reflect the color beam other than the specific color beam and the excitation beam, the wavelength conversion filter module can provide the specific color beam having higher color purity, and the illumination system adopting the wavelength conversion filter module can omit the filter wheel but achieve the desired color specification.

In order to make the aforementioned features and advantages of the disclosure more comprehensible, embodiments accompanied with figures are described in detail below.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
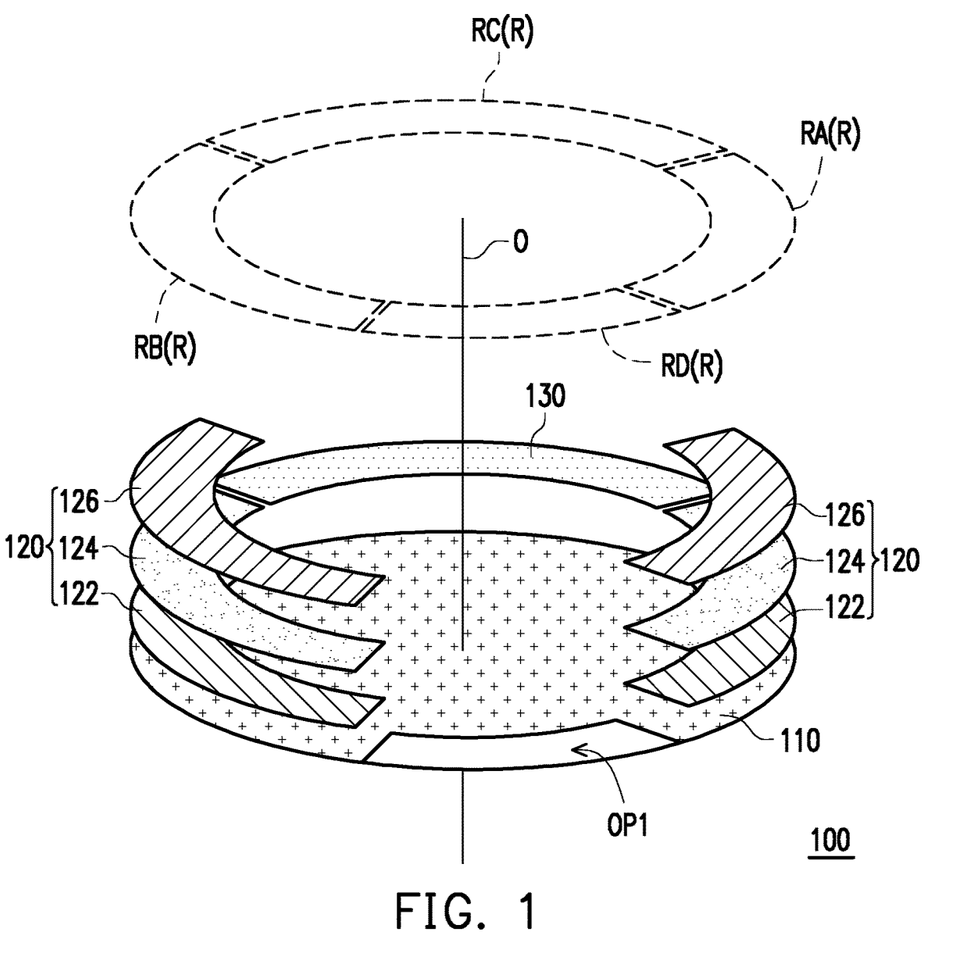
FIG. 1 is an exploded view of a wavelength conversion filter module according to the first embodiment of the invention.
Figure 2:
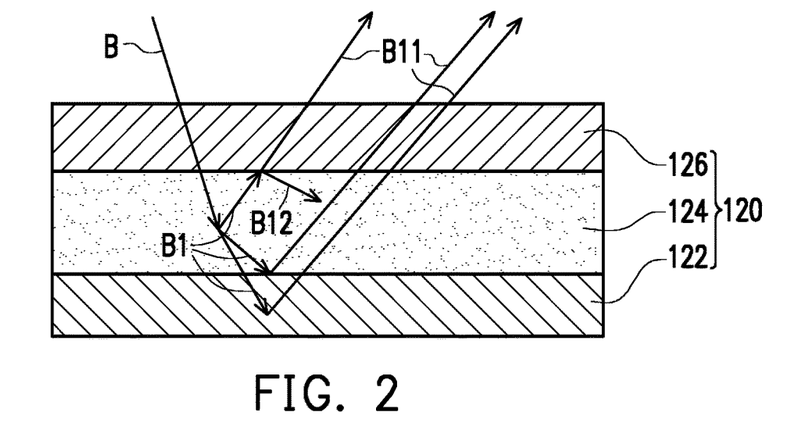
FIG. 2 is a cross section view of a wavelength conversion filter unit in FIG. 1.

FIG. 1 is an exploded view of a wavelength conversion filter module according to the first embodiment of the invention. FIG. 2 is a cross section view of a wavelength conversion filter unit in FIG. 1.

Referring to FIG. 1, a wavelength conversion filter module 100 includes a carrier 110 and a wavelength conversion filter unit 120. The carrier 110 is suitable for carrying the wavelength conversion filter unit 120 and assisting in heat dissipation. For instance, the carrier 110 can be a metal carrier such as a carrier formed by aluminum die-casting, but is not limited thereto.

The carrier 110 has a plurality of optical regions R disposed adjacent to one another and is adapted to move to allow the optical regions R to receive an excitation beam from an excitation light source (not shown) in order. For instance, the shape of the carrier 110 can be substantially a circle or a ring having a rotation axis O. The optical regions R are disposed along the circumference of the carrier 110 to surround the rotation axis O, and when the carrier 110 rotates around the rotation axis O, the optical regions R can cut into the transmission path of the excitation beam in order.

At least one of the optical regions R is a wavelength conversion filter region. For instance, the optical regions R can include a wavelength conversion filter region RA and a wavelength conversion filter region RB. However, the quantity of the wavelength conversion filter region in the optical regions R can be changed as needed and is not limited thereto.

The quantity of the wavelength conversion filter unit 120 is equal to the quantity of the wavelength conversion filter region. As shown in FIG. 1, the wavelength conversion filter module 100 can include two wavelength conversion filter units 120, and the two wavelength conversion filter units 120 are respectively located in the wavelength conversion filter region RA and the wavelength conversion filter region RB. Each of the wavelength conversion filter units 120 includes a filter reflective device 122, a wavelength conversion device 124, and a first filter device 126 disposed on the carrier 110 in order.

Referring to FIG. 2, the excitation beam B is incident on the wavelength conversion filter unit 120 from the first filter device 126. The first filter device 126 is suitable for allowing the excitation beam B incident on the wavelength conversion filter unit 120 to pass through. The wavelength conversion device 124 is suitable for absorbing the excitation beam B having a relatively short wavelength and emitting a conversion beam B1 having a relatively long wavelength. The conversion beam B1 includes a specific color beam B11 and a color beam B12 other than the specific color beam B11. The filter reflective device 122 is suitable for reflecting the specific color beam B11 and absorbing the color beam B12 other than the specific color beam B11. The first filter device 126 is suitable for allowing the specific color beam B11 and the excitation beam B to pass through and reflecting a color beam (such as the color beam B12) other than the specific color beam B11 and the excitation beam B. Moreover, a small amount of the specific color beam B11 not reflected by the filter reflective device 122 is reflected by the metal carrier 110 (not shown), and then passes through the filter reflective device 122 and the wavelength conversion device 124 and is emitted from the first filter device 126, and the color beam B12 other than the small amount of the specific color beam B11 not absorbed by the filter reflective device 122 is reflected by the metal carrier 110 and is then absorbed by the filter reflective device 122 or reflected by the first filter device 126. As a result, via the disposition of the filter reflective device 122 and the first filter device 126 of the wavelength conversion filter unit 120, the specific color beam B11 emitted from the first filter device 126 can have higher color purity.

In an embodiment in which the excitation beam B is a blue beam and the specific color beam B11 is a red beam, the wavelength conversion device 124 includes a phosphor that can emit yellow beam. The first filter device 126 is suitable for allowing blue beam and red beam to pass through and reflecting other color beams. The blue beam is incident on the wavelength conversion filter unit 120 from the first filter device 126. The wavelength conversion device 124 absorbs blue beam and emits yellow beam (such as the conversion beam B1), and the yellow beam includes red band beam (such as the specific color beam B11) and other band beams (such as the color beam B12 other than the specific color beam B11). A portion of the yellow beam spread to the surrounding is transmitted toward the filter reflective device 122, and another portion is transmitted toward the first filter device 126. The red band beam in the yellow beam transmitted toward the filter reflective device 122 is reflected by the filter reflective device 122, and the other band beams in the yellow beam are absorbed by the filter reflective device 122. The red band beam (such as the specific color beam B11) in the yellow beam transmitted toward the first filter device 126 is emitted from the first filter device 126, and other band beams (such as the color beam B12) in the yellow beam are reflected by the first filter device 126 and transmitted toward the filter reflective device 122 and absorbed by the filter reflective device 122. Moreover, a small amount of the beam passing through the filter reflective device 122 is reflected by the metal carrier 110. As a result, via the disposition of the filter reflective device 122 and the first filter device 126 of the wavelength conversion filter unit 120, the red beam emitted from the first filter device 126 can have higher color purity.

In an embodiment in which the excitation beam B is a blue beam and the specific color beam B11 is a green beam, the wavelength conversion device 124 includes a phosphor that can emit green beam. The first filter device 126 is suitable for allowing blue beam and green beam to pass through and reflecting other color beams. The wavelength conversion device 124 absorbs blue beam and emits green beam (such as the conversion beam B1). A portion of the green beam spread to the surrounding is transmitted toward the first filter device 126, and another portion is transmitted toward the filter reflective device 122. The green beam transmitted toward the first filter device 126 is emitted from the first filter device 126. The green beam transmitted toward the filter reflective device 122 is reflected by the filter reflective device 122 and changes direction, and is emitted from the first filter device 126 after passing through the wavelength conversion device 124 and the first filter device 126 in order. The filter reflective device 122 can be designed to reflect beams of a specific green band in the green light and absorb beams of reddish or bluish bands in the green light, and the first filter device 126 can also be designed to allow beams of a specific green band and the excitation beam B to pass through and reflect beams (such as beams of reddish or bluish bands in red beam and green beam) other than the beams of the specific green band and the excitation beam B. Moreover, a small amount of the beam passing through the filter reflective device 122 is reflected by the metal carrier 110. As a result, via the disposition of the filter reflective device 122 and the first filter device 126 of the wavelength conversion filter unit 120, the green beam emitted from the first filter device 126 can have higher color purity.

Referring to FIG. 1 and FIG. 2, in the embodiment, the wavelength conversion filter unit 120 in the wavelength conversion filter region RA and the wavelength conversion filter region RB can be a red wavelength conversion filter unit and a green wavelength conversion filter unit respectively, i.e., the red wavelength conversion filter unit and the green wavelength conversion filter unit of the wavelength conversion filter module 100 can provide a red beam and a green beam respectively, but the invention is not limited thereto. In different wavelength conversion filter units 120, the filter reflective device 122 includes a pigment corresponding to the specific color beam (red beam or green beam) or an absorbent glass powder corresponding to the specific color beam, and the filter reflective device 122 can further include a heat-resistant gel mixed with a high reflectivity powder such as titanium dioxide or silicon dioxide powder to further increase the reflectivity of the specific color beam and provide heat dissipation effect. The wavelength conversion device 124 can also include ceramic powder or glass powder in addition to including phosphor. The phosphor can be sintered into a hard structure resistant to high temperature and having high surface hardness with the ceramic powder or glass powder, the hard structure can form a smooth surface via polishing, and the smooth surface is suitable for a subsequent coating treatment (such as forming the first filter device 126 on the smooth surface).

Figure 3:
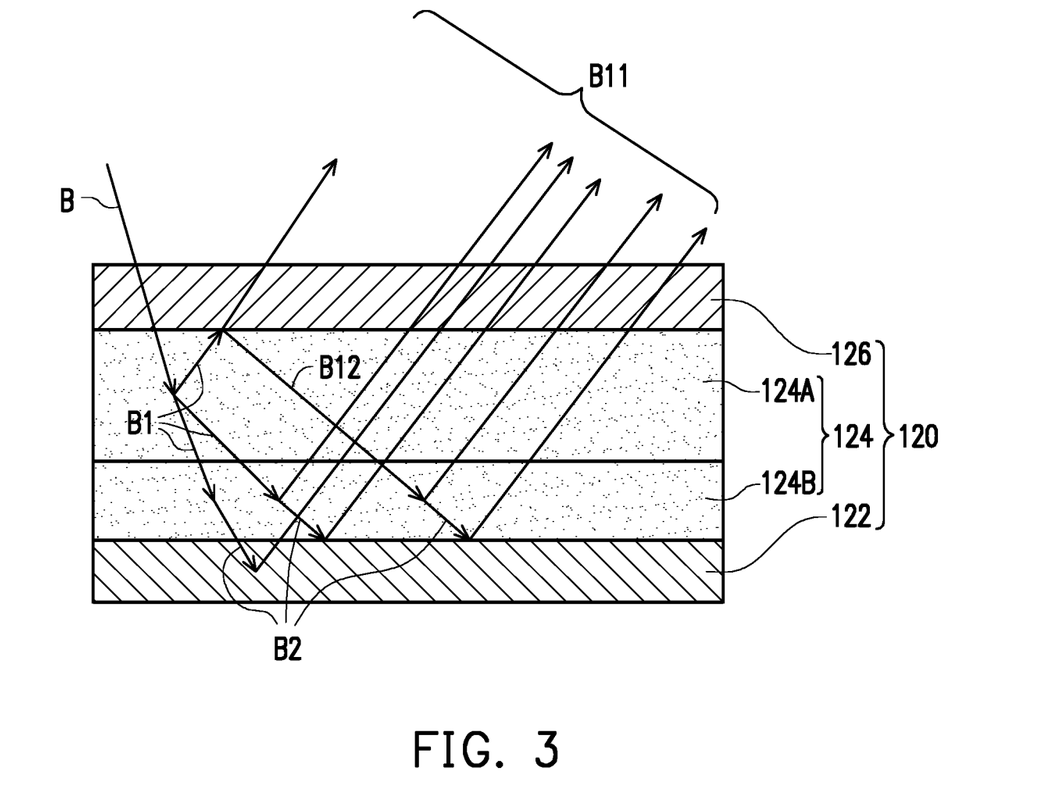
FIG. 3 is another cross section view of the wavelength conversion filter unit in FIG. 1.

The wavelength conversion device 124 can include one or a plurality of wavelength conversion layers. FIG. 3 is another cross section view of the wavelength conversion filter unit in FIG. 1. The main difference between the wavelength conversion filter units 120 in FIG. 3 and FIG. 2 is the quantity of the wavelength conversion layer in the wavelength conversion device 124. Specifically, the wavelength conversion device 124 of FIG. 2 only has one wavelength conversion layer, and the wavelength conversion device 124 of FIG. 3 has a plurality of wavelength conversion layers, and the plurality of wavelength conversion layers have different or partially overlapped excitation spectrums.

More specifically, in FIG. 3, the wavelength conversion device 124 includes a first wavelength conversion layer 124A and a second wavelength conversion layer 124B. The second wavelength conversion layer 124B is located between the first wavelength conversion layer 124A and the filter reflective device 122, wherein the peak value of the excitation spectrum of the first wavelength conversion layer 124A is less than the peak value of the excitation spectrum of the second wavelength conversion layer 124B.

In an embodiment in which the excitation beam B is a blue beam and the specific color beam B11 is a red beam, the first wavelength conversion layer 124A includes a phosphor that can emit yellow beam, and the second wavelength conversion layer 124B includes a phosphor that can emit red beam. The phosphor that can emit red beam and the phosphor that can emit yellow beam have overlapped excitation spectrums, and the peak value of the excitation spectrum of the phosphor that can emit yellow beam is less than the peak value of the excitation spectrum of the phosphor that can emit red beam. The first filter device 126 is suitable for allowing blue beam and red beam to pass through and reflecting other color beams. The excitation beam B (blue beam) passes through the first filter device 126 and is transmitted to the first wavelength conversion layer 124A. The first wavelength conversion layer 124A absorbs blue beam and emits yellow beam (such as the conversion beam B1), and the yellow beam includes red band beam (such as the specific color beam B11) and other band beams (such as the color beam B12 other than the specific color beam B11). A portion of the yellow beam spread to the surrounding is transmitted toward the first filter device 126, and another portion is transmitted toward the second wavelength conversion layer 124B. The red band beam in the yellow beam transmitted toward the first filter device 126 is emitted from the first filter device 126, and other band beams in the yellow beam are reflected by the first filter device 126 and transmitted toward the second wavelength conversion layer 124B. The second wavelength conversion layer 124B absorbs the yellow beam passing through the first wavelength conversion layer 124A and a small amount of blue beam not converted by the first wavelength conversion layer 124A and emits red beam (such as the conversion beam B2). The red beam emitted by the second wavelength conversion layer 124B is spread to the surrounding. A portion of the red beam spread to the surrounding passes through the first wavelength conversion layer 124A and the first filter device 126 in order and is emitted from the first filter device 126. Another portion of the red beam spread to the surrounding is first reflected by the filter reflective device 122 and then passes through the second wavelength conversion layer 124B, the first wavelength conversion layer 124A, and the first filter device 126 in order, and is emitted from the first filter device 126. Moreover, a small amount of the beam passing through the filter reflective device 122 is reflected by the metal carrier 110.

Referring further to FIG. 1, based on different types of the processed beams, the optical regions R can further include a light penetration region, a wavelength conversion region, or other types of regions. The light penetration region is suitable for allowing an excitation beam to pass through. The wavelength conversion region is suitable for providing the effect of wavelength conversion, and can convert an excitation beam into a conversion beam. As shown in FIG. 1, the optical regions R can further include a wavelength conversion region RC and a light penetration region RD.

The wavelength conversion filter module 100 can further include a wavelength conversion device 130 located in the wavelength conversion region RC. The wavelength conversion device 130 can include a phosphor that can emit yellow beam to convert an excitation beam incident on the wavelength conversion region RC into yellow beam. A portion of the yellow beam spread to the surrounding is directly emitted toward the direction away from the carrier 110, and another portion is transmitted toward the carrier 110 and reflected by the carrier 110 and changes direction, and is emitted toward the direction away from the carrier 110.

The light penetration region RD is suitable for allowing an excitation beam to pass through. As shown in FIG. 1, the carrier 110 can have an opening OP1 corresponding to the light penetration region RD. When the carrier 110 rotates around the rotation axis O, the light penetration region RD cuts into the transmission path of the excitation beam, and the excitation beam can pass through the opening OP1 of the carrier 110.

Figure 4:
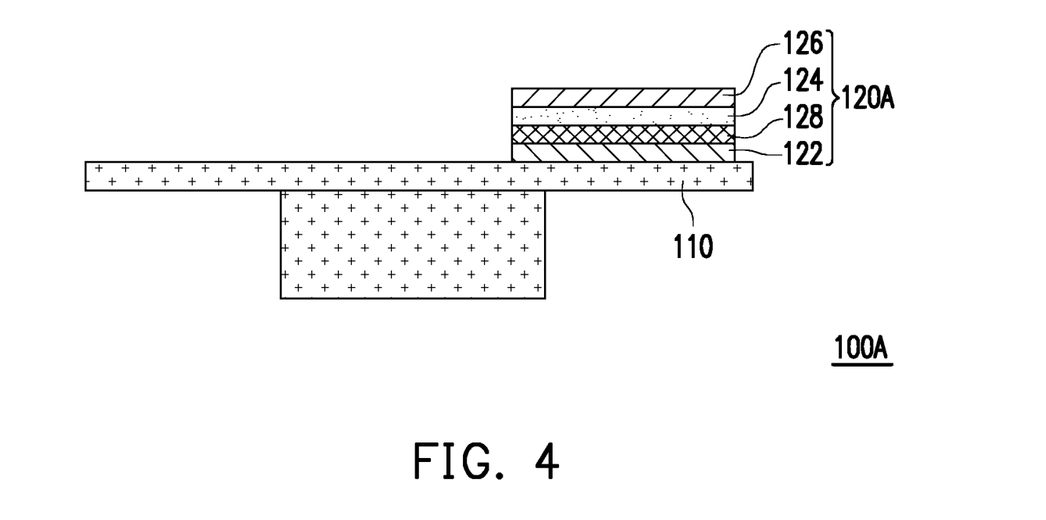
FIG. 4 to FIG. 6 are cross section views of wavelength conversion filter modules of the second embodiment to the fourth embodiment of the invention respectively.
Figure 5:
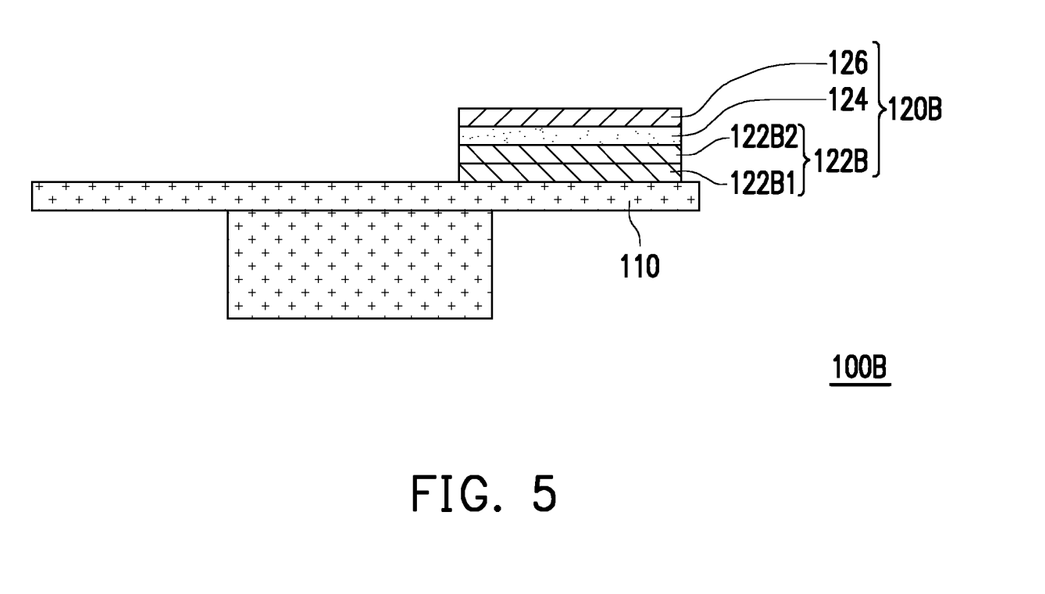
Figure 6:
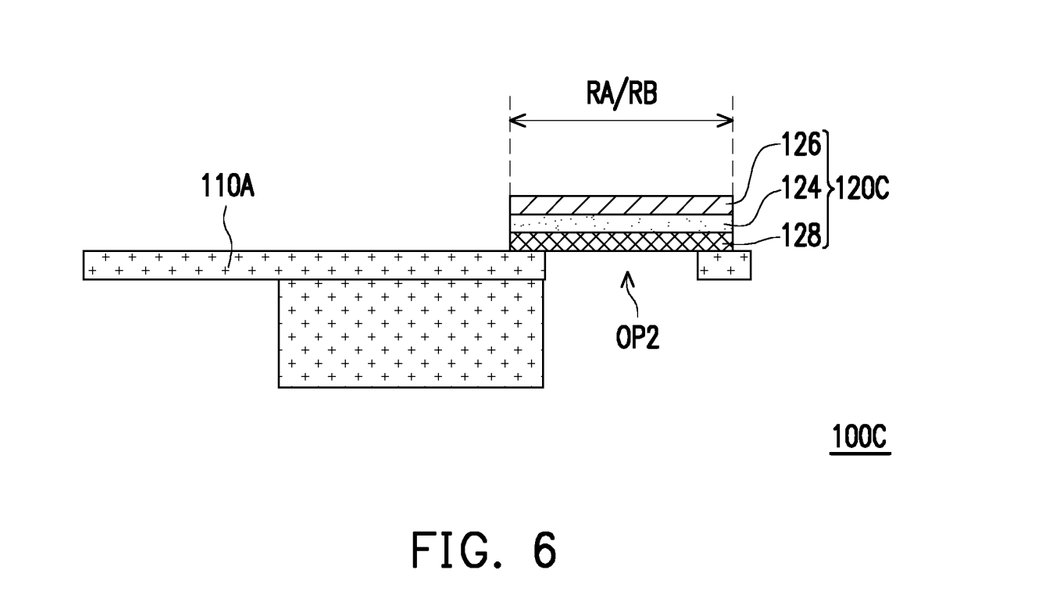

FIG. 4 to FIG. 6 are cross section views of the wavelength conversion filter modules of the second embodiment to the fourth embodiment of the invention respectively, wherein the same or similar devices are represented by the same or similar reference numerals and are not repeated herein, and FIG. 4 to FIG. 6 show one wavelength conversion filter unit as example, but the invention is not limited thereto. Moreover, the wavelength conversion device 124 in FIG. 4 to FIG. 6 can include one or a plurality of wavelength conversion layers, which is also not repeated herein.

Referring to FIG. 4, the main differences between a wavelength conversion filter module 100A and the wavelength conversion filter module 100 of FIG. 1 are described below. In FIG. 4, a wavelength conversion filter unit 120A further includes a second filter device 128. The second filter device 128 is disposed between the filter reflective device 122 and the wavelength conversion device 124, wherein the first filter device 126 is suitable for allowing a specific color beam to pass through and reflecting a color beam other than the specific color beam, and the second filter device 128 is suitable for reflecting the specific color beam and allowing the color beam other than the specific color beam to pass through. In the case that the specific color beam is a red beam, the first filter device 126 is suitable for allowing the red beam to pass through and reflecting a color beam (such as green beam and blue beam) other than the red beam, and the second filter device 128 is suitable for reflecting the red beam and allowing a color beam (such as green beam and blue beam) other than the red beam to pass through. As a result, the red beam can be effectively guided toward the first filter device 126 such that the red beam is emitted from the first filter device 126, and the color beam other than the red beam can be effectively guided toward the filter reflective device 122 such that the color beam other than the red beam is absorbed by the filter reflective device 122, and the red beam emitted from the first filter device 126 can have higher color purity as a result. Here, although the red wavelength conversion filter unit is exemplified, the wavelength conversion filter unit 120A can also be a green wavelength conversion filter unit.

Referring to FIG. 5, the main differences between a wavelength conversion filter module 100B and the wavelength conversion filter module 100 of FIG. 1 are described below. In FIG. 5, a filter reflective device 122B of a wavelength conversion filter unit 120B includes a reflective layer 122B1 and a second filter device 122B2. The second filter device 122B2 is disposed between the reflective layer 122B1 and the wavelength conversion device 124. The reflective layer 122B1 is suitable for increasing reflectivity. For instance, the reflective layer 122B1 can be an Ag coating, a dielectric coating, or a high-reflectivity powder such as titanium dioxide or silicon dioxide powder mixed in heat-resistant gel. The second filter device 122B2 is suitable for reflecting a specific color beam and allowing a color beam other than the specific color beam to pass through, and descriptions thereof are as provided for FIG. 4 and are therefore not repeated herein.

Referring to FIG. 6, the main differences between a wavelength conversion filter module 100C and the wavelength conversion filter module 100A of FIG. 4 are described below. A wavelength conversion filter unit 120C of FIG. 6 omits the filter reflective device 122 of FIG. 4, and the carrier 110A has an opening OP2 overlapped with the wavelength conversion filter region (such as the wavelength conversion filter region RA or the wavelength conversion filter region RB). The second filter device 128, the wavelength conversion device 124, and the first filter device 126 are stacked on the carrier 110A in order and cover the opening OP2. When the carrier 110A rotates and the wavelength conversion filter region cuts into the transmission path of the excitation beam, a color beam other than the specific color beam passing through the second filter device 128 can pass through the opening OP2 of the carrier 110A and be emitted from the wavelength conversion filter module 100C, and then can be filtered by a filter device (not shown) disposed outside the wavelength conversion filter module 100C or absorbed by a light absorbing device (not shown) disposed outside the wavelength conversion filter module 100C. In addition to passing beams, the opening OP2 of the carrier 110A can also reduce the accumulation of heat to increase heat dissipation effect.

Figure 7:
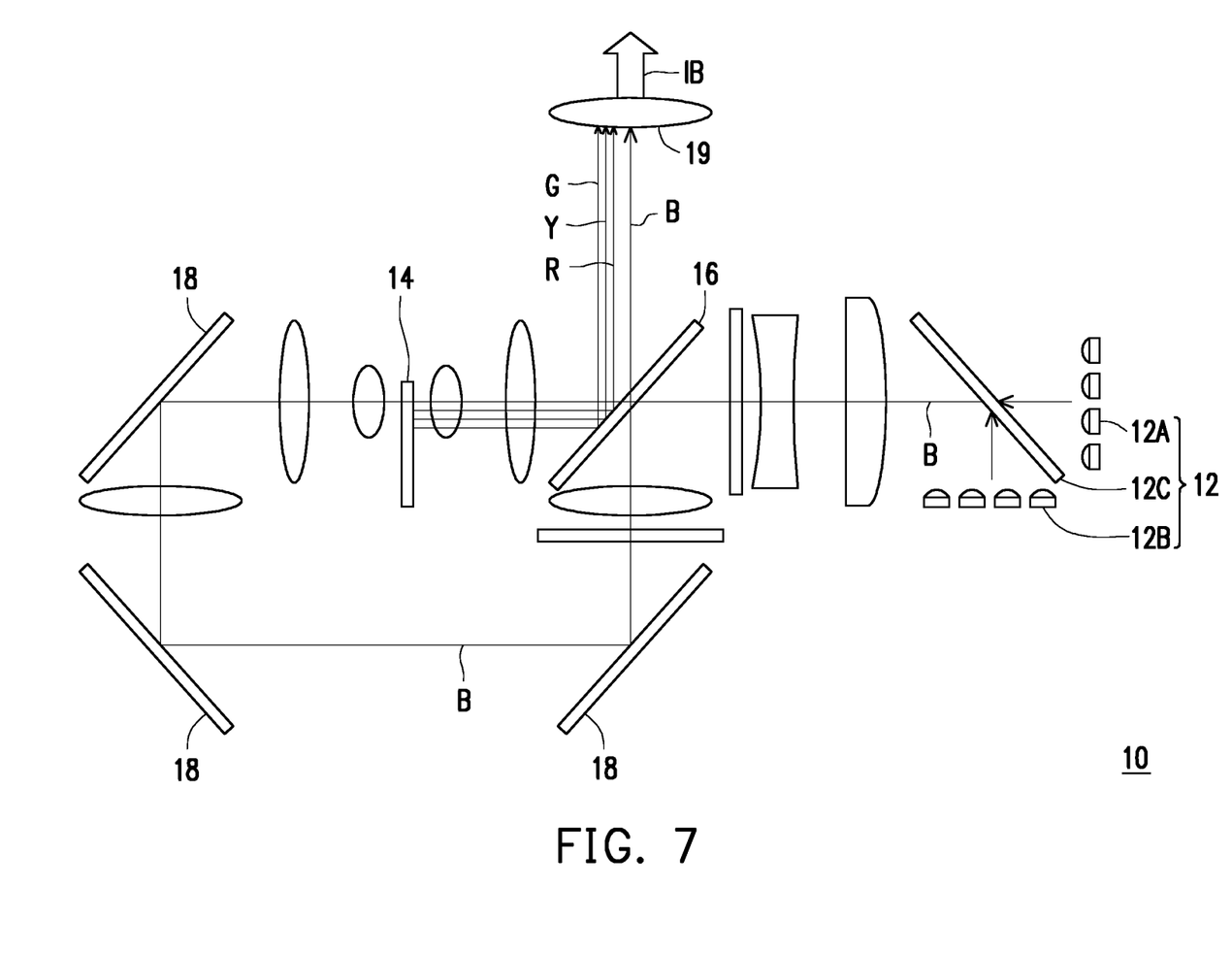
FIG. 7 is a schematic of an illumination system according to an embodiment of the invention.

FIG. 7 is a schematic of an illumination system according to an embodiment of the invention. Referring to FIG. 7, an illumination system 10 includes an excitation light source 12 suitable for providing the excitation beam B and a wavelength conversion filter module 14. The wavelength conversion filter module 14 is disposed on the transmission path of the excitation beam B, and the wavelength conversion filter module 14 can adopt the wavelength conversion filter module 100 shown in FIG. 1, the wavelength conversion filter module 100A shown in FIG. 4, the wavelength conversion filter module 100B shown in FIG. 5, or the wavelength conversion filter module 100C shown in FIG. 6.

The excitation light source 12 is a laser light source, and the excitation beam B is a laser beam. For instance, the excitation light source 12 can be a blue laser diode bank, and the excitation beam B can be a blue excitation beam, but the invention is not limited thereto. As shown in FIG. 7, the excitation light source 12 can include a blue laser diode bank 12A, a blue laser diode bank 12B, and a beam combiner device 12C. The beam combiner device 12C is a reflective sheet having a plurality of holes (not shown), the holes on the reflective sheet allow the laser beam emitted by the blue laser diode bank 12A to pass through, and the reflective surface on the reflective sheet reflects the laser beam emitted by the blue laser diode bank 12B. Therefore, the laser beams emitted by the blue laser diode bank 12A and the blue laser diode bank 12B can be combined into the excitation beam B by the beam combiner device 12C.

The illumination system 10 can further include a beam splitter device 16, a plurality of reflectors 18, and a beam combiner device 19. The beam splitter device 16 is disposed on the transmission path of the excitation beam B, and the beam splitter device 16 is located between the excitation light source 12 and the wavelength conversion filter module 14. The beam splitter device 16 is suitable for allowing the excitation beam B (such as blue beam) to pass through and reflecting other color beams (such as red beam, green beam, and yellow beam). For instance, the beam splitter device 16 can be a dichroic mirror or dichroic prism, but is not limited thereto.

The wavelength conversion filter module 14 is disposed on the transmission path of the excitation beam B from the beam splitter device 16, wherein the wavelength conversion filter unit of the wavelength conversion filter module 14 is disposed on the surface of the carrier facing the beam splitter device 16, and the carrier is suitable for rotating around the rotation axis thereof such that the optical regions cut into the transmission path of the excitation beam B in order. In the case that the carrier rotates counterclockwise, the light penetration region RD, the wavelength conversion filter region RA, the wavelength conversion region RC, and the wavelength conversion filter region RB of the optical regions R in FIG. 1 can cut into the transmission path of the excitation beam B in FIG. 7 in order.

Referring to FIG. 1 and FIG. 7, when the light penetration region RD cuts into the transmission path of the excitation beam B, the excitation beam B passing through the beam splitter device 16 then passes through the opening OP1 of the carrier 110 and returns to the beam splitter device 16 via the reflection of the reflector 18 and then passes through the beam splitter device 16 again to be transmitted toward the beam combiner device 19. When the wavelength conversion filter region RA cuts into the transmission path of the excitation beam B, the excitation beam B passing through the beam splitter device 16 is converted into a specific color beam (such as the red beam R) by the wavelength conversion filter unit 120 located on the wavelength conversion filter region RA, and the red beam R is transmitted back to the beam splitter device 16 via the wavelength conversion filter unit 120. When the wavelength conversion region RC cuts into the transmission path of the excitation beam B, the excitation beam B passing through the beam splitter device 16 is converted into the yellow beam Y by the wavelength conversion device 130 located on the wavelength conversion region RC, and the yellow beam Y is reflected back to the beam splitter device 16 by the carrier 110. When the wavelength conversion filter region RB cuts into the transmission path of the excitation beam B, the excitation beam B passing through the beam splitter device 16 is converted into another specific color beam (such as the green beam G) by the wavelength conversion filter unit 120 located on the wavelength conversion filter region RB, and the green beam G is transmitted back to the beam splitter device 16 via the wavelength conversion filter unit 120. The red beam R, the yellow beam Y, and the green beam G transmitted back to the beam splitter device 16 are reflected by the beam splitter device 16 and transmitted toward the beam combiner device 19. The beam combiner device 19 is disposed on the transmission paths of the red beam R, the yellow beam Y, and the green beam G reflected by the beam splitter device 16 and the excitation beam B passing through the beam splitter device 16 again, and combines the red beam R, the yellow beam Y, and the green beam G and the excitation beam B passing through the beam splitter device 16 again into an illumination beam IB.

Based on different needs, the illumination system 10 can further include other devices such as a lens device (not labeled) located between the optical devices, integral columns located on the transmission path of the illumination beam IB and adjusting the optical shape of the illumination beam IB, a microdisplay (such as a digital micromirror device) that can provide a grayscale image, or a projection lens group.

Based on the above, the embodiments of the invention have at least one of the following advantages or efficacies. In the wavelength conversion filter module of an embodiment of the invention, since the filter reflective device disposed on the carrier can reflect the specific color beam of the conversion beam from the wavelength conversion device and absorb a color beam other than the specific color beam, and the first filter device disposed on the wavelength conversion device can allow the excitation beam and the specific color beam to pass through and reflect a color beam other than the specific color beam and the excitation beam, the wavelength conversion filter module can provide a specific color beam having higher color purity, and the illumination system adopting the wavelength conversion filter module can omit the filter wheel but achieve the desired color specification. In an embodiment, in addition to including the pigment of the specific color beam or the absorbent glass powder of the specific color beam, the filter reflective device can further include a high-reflectivity powder to further increase the reflectivity of the specific color beam and provide heat dissipation effect. In the wavelength conversion filter module of another embodiment of the invention, since the second filter device disposed below the wavelength conversion device can reflect the specific color beam of the conversion beam and allow the color beam other than the specific color beam to pass through, and the color beam other than the specific color beam is emitted from the wavelength conversion filter module via the opening of the carrier and can be filtered by a filter device disposed outside the wavelength conversion filter module or absorbed by a light absorbing device disposed outside the wavelength conversion filter module, and the first filter device disposed on the wavelength conversion device can allow the excitation beam and the specific color beam to pass through and reflect the color beam other than the specific color beam and the excitation beam, the wavelength conversion filter module can provide a specific color beam having higher color purity, and the illumination system adopting the wavelength conversion filter module can omit the filter wheel but achieve the desired color specification. Moreover, the opening of the carrier can reduce the accumulation of heat to increase heat dissipation effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A wavelength conversion filter module, comprising:
a carrier having a plurality of optical regions and adapted to move to allow the plurality of optical regions to receive an excitation beam in order, wherein at least one of the plurality of optical regions is a wavelength conversion filter region; and
a wavelength conversion filter unit located in the wavelength conversion filter region and comprising a filter reflective device, a wavelength conversion device, and a first filter device disposed on the carrier in order, wherein the first filter device is suitable for allowing the excitation beam incident on the wavelength conversion filter unit to pass through, the wavelength conversion device is suitable for converting the excitation beam into a conversion beam, the conversion beam comprises a specific color beam and a color beam other than the specific color beam, the filter reflective device is suitable for reflecting the specific color beam and absorbing the color beam other than the specific color beam, and the first filter device is suitable for allowing the specific color beam to pass through and reflecting a color beam other than the specific color beam and the excitation beam.

2. The wavelength conversion filter module of claim 1, wherein the wavelength conversion device comprises one or a plurality of wavelength conversion layers, and the plurality of wavelength conversion layers have different or partially overlapped excitation spectrums.

3. The wavelength conversion filter module of claim 2, wherein the wavelength conversion device comprises a first wavelength conversion layer and a second wavelength conversion layer, the second wavelength conversion layer is located between the first wavelength conversion layer and the filter reflective device, and a peak value of the excitation spectrum of the first wavelength conversion layer is less than a peak value of the excitation spectrum of the second wavelength conversion layer.

4. The wavelength conversion filter module of claim 1, wherein the wavelength conversion filter unit further comprises:
   a second filter device disposed between the filter reflective device and the wavelength conversion device, wherein the second filter device is suitable for reflecting the specific color beam and allowing the color beam other than the specific color beam to pass through.

5. The wavelength conversion filter module of claim 1, wherein the filter reflective device comprises a reflective layer and a second filter device, the second filter device is disposed between the reflective layer and the wavelength conversion device, and the second filter device is suitable for reflecting the specific color beam and allowing the color beam other than the specific color beam to pass through.

6. The wavelength conversion filter module of claim 1, wherein the filter reflective device comprises a pigment corresponding to the specific color beam or an absorbent glass powder corresponding to the specific color beam.

7. A wavelength conversion filter module, comprising:
   a carrier having a plurality of optical regions and adapted to move to allow the plurality of optical regions to receive an excitation beam in order, wherein at least one of the plurality of optical regions is a wavelength conversion filter region, and the carrier has an opening overlapped with the wavelength conversion filter region; and
   a wavelength conversion filter unit located in the wavelength conversion filter region and comprising a second filter device, a wavelength conversion device, and a first filter device disposed on the carrier in order, wherein the first filter device is suitable for allowing the excitation beam incident on the wavelength conversion filter unit to pass through, the wavelength conversion device is suitable for converting the excitation beam into a conversion beam, the conversion beam comprises a specific color beam and a color beam other than the specific color beam, the second filter device is suitable for reflecting the specific color beam and allowing the color beam other than the specific color beam to pass through, and the first filter device is suitable for allowing the specific color beam to pass through and reflecting a color beam other than the specific color beam and the excitation beam.

8. The wavelength conversion filter module of claim 7, wherein the wavelength conversion device comprises one or a plurality of wavelength conversion layers, and the plurality of wavelength conversion layers have different or partially overlapped excitation spectrums.

9. The wavelength conversion filter module of claim 8, wherein the wavelength conversion device comprises a first wavelength conversion layer and a second wavelength conversion layer, the second wavelength conversion layer is located between the first wavelength conversion layer and the second filter device, and a peak value of the excitation spectrum of the first wavelength conversion layer is less than a peak value of the excitation spectrum of the second wavelength conversion layer.

10. An illumination system, comprising:
    an excitation light source adapted to provide an excitation beam; and
    a wavelength conversion filter module disposed on a transmission path of the excitation beam and comprising:
       a carrier having a plurality of optical regions and adapted to move to allow the plurality of optical regions to receive the excitation beam in order, wherein at least one of the plurality of optical regions is a wavelength conversion filter region; and
       a wavelength conversion filter unit located in the wavelength conversion filter region and comprising a filter reflective device, a wavelength conversion device, and a first filter device disposed on the carrier in order, wherein the first filter device is suitable for allowing the excitation beam to pass through, the wavelength conversion device is suitable for converting the excitation beam into a conversion beam, the conversion beam comprises a specific color beam and a color beam other than the specific color beam, the filter reflective device is suitable for reflecting the specific color beam and absorbing the color beam other than the specific color beam, and the first filter device is suitable for allowing the specific color beam to pass through and reflecting a color beam other than the specific color beam and the excitation beam.

11. The illumination system of claim 10, wherein the wavelength conversion device comprises one or a plurality of wavelength conversion layers, and the plurality of wavelength conversion layers have different or partially overlapped excitation spectrums.

12. The illumination system of claim 11, wherein the wavelength conversion device comprises a first wavelength conversion layer and a second wavelength conversion layer, the second wavelength conversion layer is located between the first wavelength conversion layer and the filter reflective device, and a peak value of the excitation spectrum of the first wavelength conversion layer is less than a peak value of the excitation spectrum of the second wavelength conversion layer.

13. The illumination system of claim 10, wherein the wavelength conversion filter unit further comprises:
    a second filter device disposed between the filter reflective device and the wavelength conversion device, wherein the second filter device is suitable for reflecting the specific color beam and allowing the color beam other than the specific color beam to pass through.

14. The illumination system of claim 10, wherein the filter reflective device comprises a reflective layer and a second filter device, the second filter device is disposed between the reflective layer and the wavelength conversion device, and the second filter device is suitable for reflecting the specific color beam and allowing the color beam other than the specific color beam to pass through.

15. The illumination system of claim 10, wherein the filter reflective device comprises a pigment corresponding to the specific color beam or an absorbent glass powder corresponding to the specific color beam.

16. An illumination system, comprising:
    an excitation light source adapted to provide an excitation beam; and
    a wavelength conversion filter module disposed on a transmission path of the excitation beam and comprising:
       a carrier having a plurality of optical regions and adapted to move to allow the plurality of optical regions to receive the excitation beam in order, wherein at least one of the plurality of optical regions is a wavelength conversion filter region, and the carrier has an opening overlapped with the wavelength conversion filter region; and a wavelength conversion filter unit located in the wavelength conversion filter region and comprising a filter reflective device, a second filter device, a wavelength conversion device, and a first filter device disposed on the carrier in order, wherein the first filter device is suitable for allowing the excitation beam incident on the wavelength conversion filter unit to pass through, the wavelength conversion device is suitable for converting the excitation beam into a conversion beam, the conversion beam comprises a specific color beam and a color beam other than the specific color beam, the second filter device is suitable for reflecting the specific color beam and allowing the color beam other than the specific color beam to pass through, and the first filter device is suitable for allowing the specific color beam to pass through and reflecting a color beam other than the specific color beam and the excitation beam.

17. The illumination system of claim 16, wherein the wavelength conversion device comprises one or a plurality of wavelength conversion layers, and the plurality of wavelength conversion layers have different or partially overlapped excitation spectrums.

18. The illumination system of claim 17, wherein the wavelength conversion device comprises a first wavelength conversion layer and a second wavelength conversion layer, the second wavelength conversion layer is located between the first wavelength conversion layer and the filter reflective device, and a peak value of the excitation spectrum of the first wavelength conversion layer is less than a peak value of the excitation spectrum of the second wavelength conversion layer.

* * * * *